United States Patent
Gibas et al.

(10) Patent No.: US 9,678,999 B1
(45) Date of Patent: Jun. 13, 2017

(54) HISTOGRAM GENERATION ON MULTIPLE DIMENSIONS

(71) Applicant: Teradata US, Inc., Dayton, OH (US)

(72) Inventors: Michael A. Gibas, Torrance, CA (US); Hien T. To, Los Angeles, CA (US)

(73) Assignee: Teradata US, Inc., Dayton, OH (US)

( * ) Notice: Subject to any disclaimer, the term of this patent is extended or adjusted under 35 U.S.C. 154(b) by 350 days.

(21) Appl. No.: 14/588,109

(22) Filed: Dec. 31, 2014

(51) Int. Cl.
*G06F 17/30* (2006.01)

(52) U.S. Cl.
CPC .. *G06F 17/30312* (2013.01); *G06F 17/30584* (2013.01)

(58) Field of Classification Search
USPC .............. 707/706, 752, 803; 382/168, 171
See application file for complete search history.

(56) References Cited

U.S. PATENT DOCUMENTS

| | | | | |
|---|---|---|---|---|
| 5,825,914 A * | 10/1998 | Tsuboi | ...................... | G06T 7/66 348/95 |
| 6,035,066 A * | 3/2000 | Michael | ............... | B23K 20/004 382/203 |
| 6,460,045 B1 * | 10/2002 | Aboulnaga | ....... | G06F 17/30469 |
| 7,020,329 B2 * | 3/2006 | Prempraneerach | .. | G06K 9/4652 382/164 |
| 7,283,667 B2 * | 10/2007 | Takeshita | ............. | H04N 1/6027 382/168 |
| 7,853,072 B2 * | 12/2010 | Han | ..................... | G06K 9/4642 382/103 |
| 8,396,293 B1 * | 3/2013 | Korah | .................. | G06K 9/0063 382/170 |
| 8,472,714 B2 * | 6/2013 | Brogren | ............. | G06K 9/00369 382/100 |
| 8,620,089 B1 * | 12/2013 | Korah | ................ | G06K 9/00201 345/419 |
| 8,843,839 B1 * | 9/2014 | Salyers | ................... | G06Q 10/10 715/751 |
| 8,879,837 B2 * | 11/2014 | Usher | ............... | G06F 17/30256 382/165 |
| 9,235,859 B2 * | 1/2016 | Bhardwaj | .......... | G06Q 30/0643 |
| 2003/0061213 A1 * | 3/2003 | Yu | ..................... | G06F 17/30705 |
| 2004/0197022 A1 * | 10/2004 | Gonsalves | ............. | G06T 5/007 382/167 |

(Continued)

*Primary Examiner* — Hanh Thai
(74) *Attorney, Agent, or Firm* — Randy L. Campbell, Jr.

(57) ABSTRACT

Based on a request, a processor may identify a multi-dimensional dataset stored in the at least one of a plurality of data tables and identify each dimension of the multi-dimensional dataset. For each respective identified dimension, the processor may sort the identified dataset on values of the respective identified dimension, partition the sorted dataset into a predetermined number of intervals associated with the respective identified dimension, determine a number of rows for each interval and select a lower boundary value and an upper boundary value for each interval. The upper boundary value may be the highest value in each interval. The lower boundary value for an interval having lowest sorted values may be the lowest value in the interval or the upper boundary value of an interval having immediately preceding partitioned values. The processor may further store the boundary values and rows for each interval of each identified dimension as the histogram. A method and computer-readable medium are also disclosed.

17 Claims, 7 Drawing Sheets

(56) References Cited

U.S. PATENT DOCUMENTS

| | | | |
|---|---|---|---|
| 2005/0013483 A1* | 1/2005 | Watson | G06K 9/342 |
| | | | 382/164 |
| 2005/0061983 A1* | 3/2005 | Stonger | G01T 1/1647 |
| | | | 250/363.03 |
| 2008/0298680 A1* | 12/2008 | Miller | G06T 5/008 |
| | | | 382/168 |
| 2010/0111400 A1* | 5/2010 | Ramirez | G01N 15/1031 |
| | | | 382/134 |
| 2010/0113091 A1* | 5/2010 | Sharma | G06K 9/4642 |
| | | | 455/556.1 |
| 2014/0310097 A1* | 10/2014 | Nomura | G06Q 30/0252 |
| | | | 705/14.49 |
| 2014/0310662 A1* | 10/2014 | Hashimoto | G06F 17/5081 |
| | | | 716/52 |
| 2015/0098610 A1* | 4/2015 | Nomura | G06F 17/30 |
| | | | 382/103 |
| 2015/0127455 A1* | 5/2015 | Penzotti | G06Q 30/0201 |
| | | | 705/14.49 |

* cited by examiner

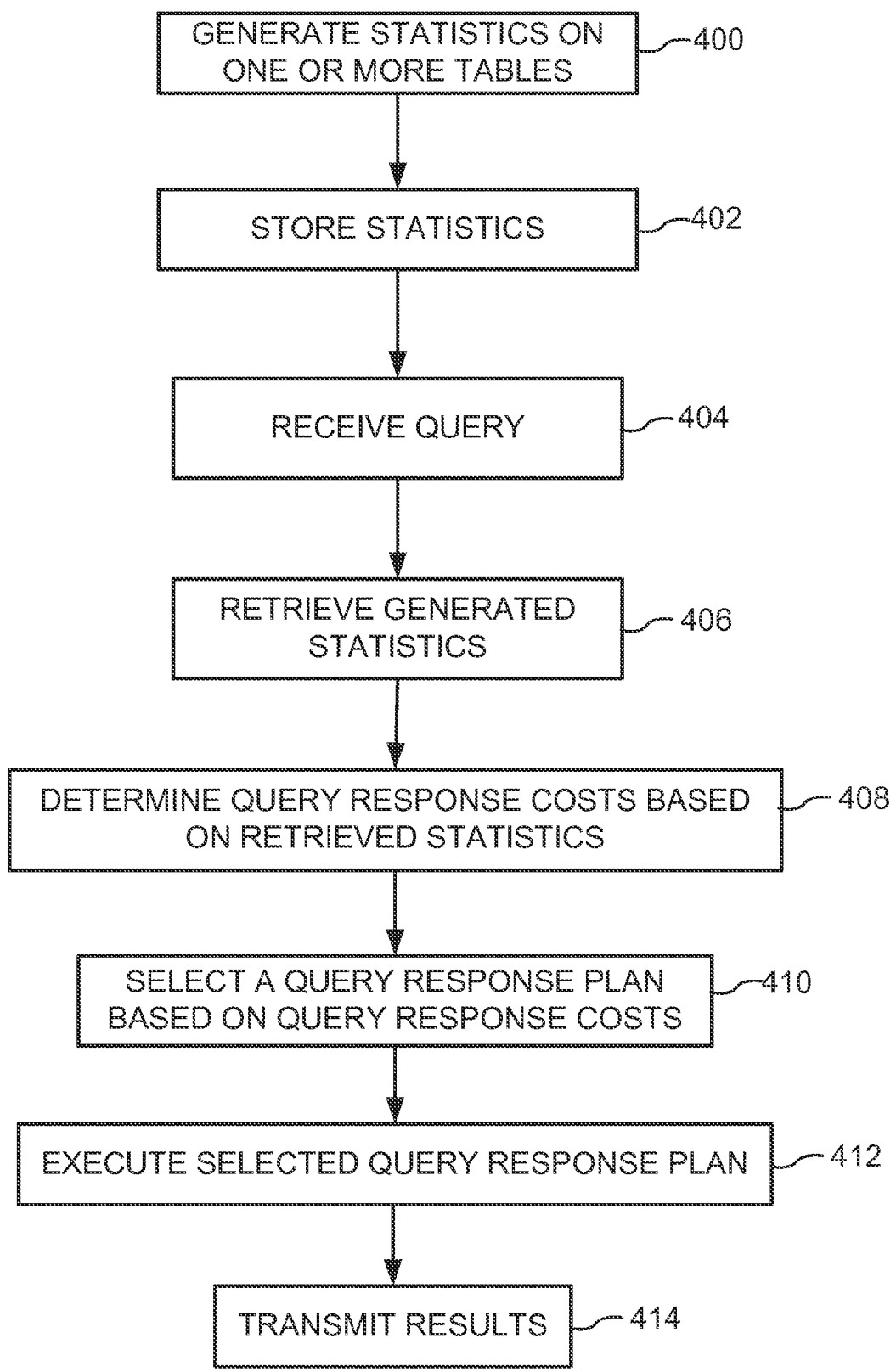

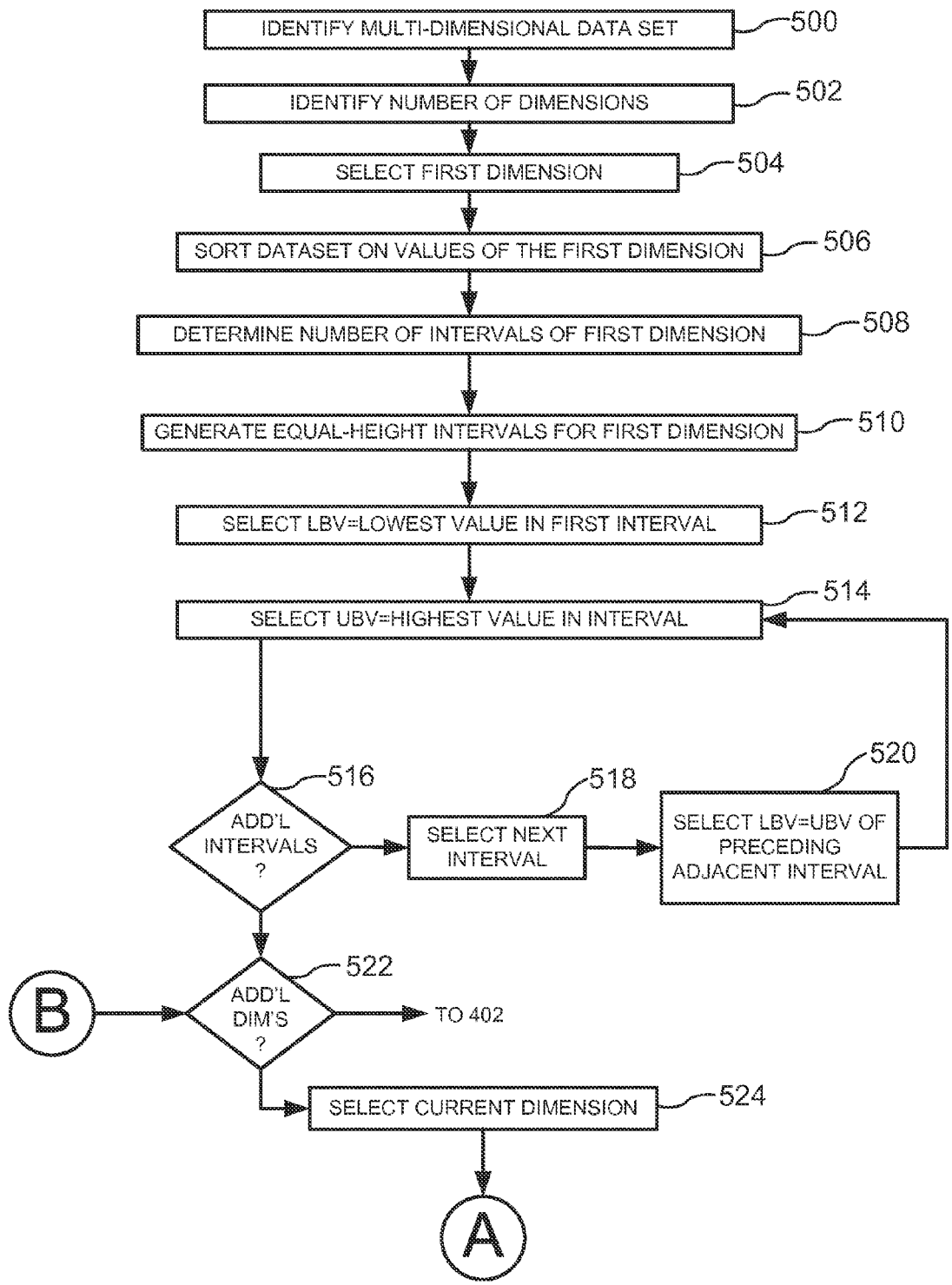

HISTOGRAM GENERATION ON MULTIPLE DIMENSIONS

BACKGROUND

1. Technical Field

The present disclosure relates generally to histogram generation, and more particularly to, histogram generation on multi-dimensional datasets.

2. Related Art

Data may be stored in columnar format in various types of data store systems, such as databases and file systems, for example. In many instances, each column represents a single attribute of interest. However, columns may be related such that they form a multi-dimensional dataset with each column representing a dimension. Such multi-dimensional aspects may be used to represent geospatial coordinates or other multi-dimensional-based information.

Various data store systems generate statistics on data, such as histograms, to be used in query response planning. These statistics may be taken on multi-dimensional datasets. However, this type of statistics gathering may require large amounts of system resources, both processing resources and storage resources. Histograms generated on multi-dimensional datasets may also be equal-sized, which may result in degraded results (cardinality estimation accuracy/histogram precision) and lead to less optimal query plans.

SUMMARY

According to one aspect of the disclosure, a data store system may include an array of persistent storage devices configured to store a plurality of data tables and a processor in communication with the persistent storage devices. The processor may receive a request to generate a multi-dimensional histogram on at least one of the plurality of data tables. The processor may identify a multi-dimensional dataset stored in the at least one of the plurality of data tables. The processor may identify each dimension of the multi-dimensional dataset. For each respective identified dimension, the processor may sort the identified multi-dimensional dataset on values of the respective identified dimension, partition the sorted dataset into a predetermined number of intervals associated with the respective identified dimension, determine a number of rows for each interval and select a lower boundary value and an upper boundary value for each interval. The upper boundary value may be the highest value in each interval. The lower boundary value for an interval having lowest sorted values may be the lowest value in the interval and the lower boundary value for each other interval may be the upper boundary value of an interval having immediately preceding partitioned values. The processor may further store the lower boundary values, upper boundary values, and number of rows for each interval of each identified dimension as the histogram. The processor may further receive a query on the at least one of the plurality of data tables. The processor may further generate a query response based on the histogram.

According to another aspect of the disclosure, a computer-implemented method may include receiving a request to generate a multi-dimensional histogram on at least one of a plurality of data tables stored in an array of persistent storage devices. The method may further include retrieving the at least one of the plurality of data tables. The method may further include identifying a multi-dimensional dataset stored in the at least one of the plurality of data tables. The method may further include identifying each dimension of the multi-dimensional dataset. The method may further include, for each respective identified dimension, sorting the identified multi-dimensional dataset on values of the respective identified dimension, partitioning the sorted dataset into a predetermined number of intervals associated with the respective identified dimension, determining a number of rows for each interval, and selecting a lower boundary value and an upper boundary value for each interval. The upper boundary value may be the highest value in each interval. The lower boundary value for an interval having lowest sorted values may be the lowest value in the interval and the lower boundary value for each other interval may be the upper boundary value of an interval having immediately preceding partitioned values. The method may further include storing the lower boundary values, upper boundary values, and number of rows for each interval of each identified dimension as the histogram. The method may further include receiving a query on the at least one of the plurality of data tables. The method may further include generating a query response based on the histogram.

According to another aspect of the disclosure, a non-transitory computer-readable medium may be encoded with a plurality of instruction executable by a processor. The plurality of instructions may include instructions to receive a request to generate a multi-dimensional histogram on at least one of a plurality of data tables stored in an array of persistent storage devices. The instructions may further include instructions to retrieve the at least one of the plurality of data tables. The instructions may further include instructions to identify a multi-dimensional dataset stored in the at least one of the plurality of data tables. The instructions may further include instructions to identify each dimension of the multi-dimensional dataset. The instructions may further include, for each respective identified dimension, instructions to sort the identified multi-dimensional dataset on values of the respective identified dimension, instructions to partition the sorted dataset into a predetermined number of intervals associated with the respective identified dimension, instructions to determine a number of rows for each interval, and instructions to select a lower boundary value and an upper boundary value for each interval. The upper boundary value may be the highest value in each interval. The lower boundary value for an interval having lowest sorted values may be the lowest value in the interval. The lower boundary value for each other interval may be the upper boundary value of an interval having immediately preceding partitioned values. The instructions may further include instructions to store the lower boundary values, upper boundary values, and number of rows for each interval of each identified dimension as the histogram. The instructions may further include instructions to receive a query on the at least one of the plurality of data tables. The instructions may further include instructions to generate a query response based on the histogram.

BRIEF DESCRIPTION OF THE DRAWINGS

The disclosure may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 4 is an operational flow diagram of example database system operation.

FIGS. 5A and 5B is an operational flow diagram of example histogram generation of a multi-dimensional dataset.

DETAILED DESCRIPTION OF THE FIGURES

Figure 1:
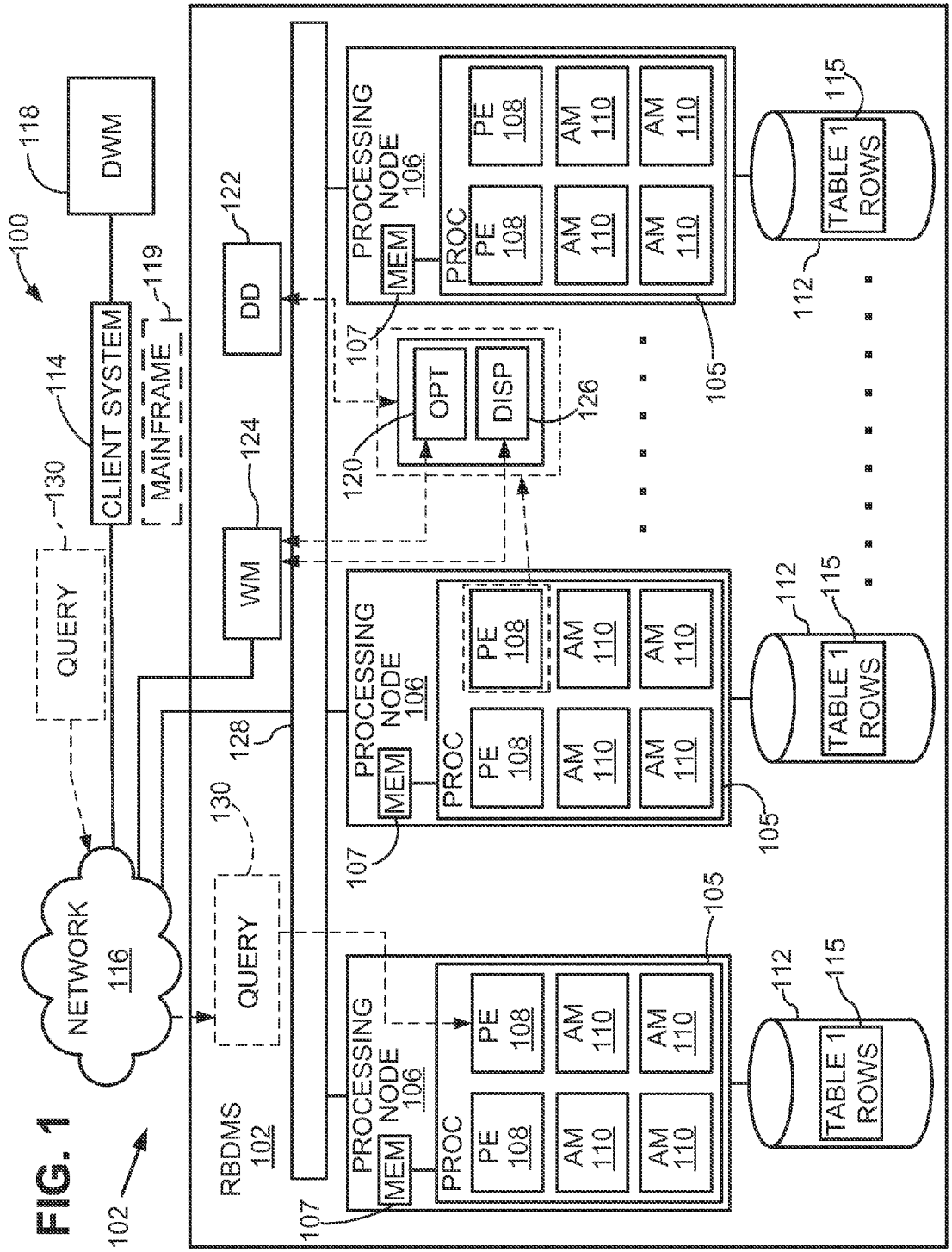
FIG. 1 is a block diagram of an example database system.

FIG. 1 is a diagrammatic representation of example architecture for a database system 100, such as a Teradata Active Data Warehousing System®. In one example, the database system 100 includes a relational database management system (RDBMS) 102 that implements a parallel-processing environment to carry out database management. The RDBMS 102 may be a combination of software (e.g., computer program routines, subroutines, applications, etc.) and hardware (e.g., processors, memory, etc.). In the example of FIG. 1, the RDBMS 102 may be a massive parallel processing (MPP) system having an array of processing units and distributed memory. In alternative examples, the RDBMS 102 may implement a single processing unit, such as in a symmetric multiprocessing (SMP) system configuration. The RDBMS 102 may include one or more processing units used to manage the storage, retrieval, and manipulation of data in data storage facilities (DSFs) 112. The array of processing units may include an array of processing nodes 106 that manage the storage, retrieval, and manipulation of data included in a database.

In one example, each processing node 106 may include one or more physical processors 105 and memory 107. The memory 107 may include one or more memories and may be computer-readable storage media or memories, such as a cache, buffer, RAM, removable media, hard drive, flash drive or other computer-readable storage media. Computer-readable storage media may include various types of volatile and nonvolatile storage media. Various processing techniques may be implemented by the processors 105 such as multiprocessing, multitasking, parallel processing and the like, for example.

The processing nodes 106 may include one or more other processing unit arrays such as parsing engine (PE) modules 108 and access modules (AM) 110. As described herein, a module, such as the parsing engine modules 108 and access modules 110, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 107, for example, that comprises instructions executable with the processor 105 or other processor to implement one or more of the features of the module. When any one of the module includes the portion of the memory that comprises instructions executable with the processor, the module may or may not include the processor. In some examples, each module may just be the portion of the memory 107 or other physical memory that comprises instructions executable with the processor 105 or other processor to implement the features of the corresponding module without the module including any other hardware. Because each module includes at least some hardware even when the included hardware comprises software, each module may be interchangeably referred to as a hardware module, such as the parsing engine hardware module or the access hardware module. The access modules 110 may be access modules processors (AMPs), such as those implemented in the Teradata Active Data Warehousing System®.

The parsing engine modules 108 and the access modules 110 may each be virtual processors (vprocs) and/or physical processors. In the case of virtual processors, the parsing engine modules 108 and access modules 110 may be executed by one or more physical processors, such as those that may be included in the processing nodes 106. For example, in FIG. 1, each parsing engine module 108 and access module 110 is associated with a respective processing node 106 and may each be executed as one or more virtual processors by physical processors 105 included in the respective processing node 106.

In FIG. 1, each processing node 106 is shown as including multiple parsing engine modules 108 and access modules 110, such that there are more parsing engine modules 108 and access modules 110 than processing nodes 106. In one example, during operation, the one or more physical processors 105 included in the processing nodes 106 may execute the parsing engine modules 108 and access modules 110 by switching between the executions of the various modules at a rapid rate allowing the vprocs to substantially operate in "parallel."

The RDBMS 102 stores data in one or more tables in the DSFs 112. In one example, rows 115 of a table, "Table 1," are distributed across the DSFs 112 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to DSFs 112 and associated access modules 110 by a hash bucket map. The characteristics of the columns chosen for the primary index determine how evenly the rows are distributed.

Rows of each stored table may be stored across multiple DSFs 112. Each parsing engine module 108 may organize the storage of data and the distribution of table rows. The parsing engine modules 108 may also coordinate the retrieval of data from the DSFs 112 in response to queries received, such as those received from a client computer system 114 connected to the RDBMS 102 through connection with a network 116. The network 116 may be wired, wireless, or some combination thereof. The network 116 may be a virtual private network, web-based, directly-connected, or some other suitable network configuration. In one example, the client computer system 114 may run a dynamic workload manager (DWM) client 118. Alternatively, the database system 100 may include a mainframe 119 used to interact with the RDBMS 102.

Each parsing engine module 108, upon receiving an incoming database query, such as the query 130, may apply an optimizer module 120 to assess the best plan for execution of the query. An example of an optimizer module 120 is shown in FIG. 1 with regard to parsing engine module 108. Additional description of the parsing engine modules 108 is provided with regard to FIGS. 2 and 3. Selecting the optimal query-execution plan may include, among other things, identifying which of the processing nodes 106 are involved in executing the query and which database tables are involved in the query, as well as choosing which data-manipulation techniques will serve best in satisfying the conditions of the query. To this end, for each parsing engine module 108, a parser module 202 (see FIG. 2), and/or optimizer module 120 may access a data dictionary module 122, shown in FIG. 1 specifically for parsing engine module 108 for purposes of illustration.

The data dictionary module 122 may specify the organization, contents, and conventions of one or more databases, such as the names and descriptions of various tables maintained by the RDBMS 102 as well as fields of each database, for example. Further, the data dictionary module 122 may specify the type, length, and/or other various characteristics of the stored tables. The RDBMS 102 typically receives queries in a standard format, such as the structured query language (SQL) put forth by the American National Standards Institute (ANSI). However, other formats, such as contextual query language (CQL), data mining extensions (DMX), and multidimensional expressions (MDX), for example, may be implemented in the database system 100 separately or in conjunction with SQL. The data dictionary may be stored in the DSFs 112 or some other storage device and selectively accessed.

The RDBMS 102 may include a workload management (WM) module 124, which in one example may be Teradata Active System Management. The WM module 124 may be implemented as a "closed-loop" system management (CLSM) architecture capable of satisfying a set of workload-specific goals. In other words, the RDBMS 102 is a goal-oriented workload management system capable of supporting complex workloads and capable of self-adjusting to various types of workloads. The WM module 124 may communicate with each optimizer module 120, as shown in FIG. 1, and is adapted to convey a confidence threshold parameter and associated parameters to the optimizer module 120 in communication. Further, the WM module 124 may communicate with a dispatcher module 126 of each parsing engine module 108 (as shown in detail FIG. 1 for parsing engine module 108) to receive query execution plan costs therefrom, and to facilitate query exception monitoring and automated modifications of confidence threshold parameters in accordance with disclosed embodiments. Further, the DWM client 118 may communicate with the WM module 124 via the network 116.

The WM module 124 operation has four major phases: 1) assigning a set of incoming request characteristics to workload groups, assigning the workload groups to priority classes, and assigning goals (referred to as Service Level Goals or SLGs) to the workload groups; 2) monitoring the execution of the workload groups against their goals; 3) regulating (e.g., adjusting and managing) the workload flow and priorities to achieve the SLGs; and 4) correlating the results of the workload and taking action to improve performance. In accordance with disclosed embodiments, the WM module 124 is adapted to facilitate control of the optimizer module 120 pursuit of robustness with regard to workloads or queries.

An interconnection 128 allows communication to occur within and between each processing node 106. For example, implementation of the interconnection 128 provides media within and between each processing node 106 allowing communication among the various processing units. Such communication among the processing units may include communication between parsing engine modules 108 associated with the same or different processing nodes 106, as well as communication between the parsing engine modules 108 and the access modules 110 associated with the same or different processing nodes 106. Through the interconnection 128, the access modules 110 may also communicate with one another within the same associated processing node 106 or other processing nodes 106.

The interconnection 128 may be hardware, software, or some combination thereof. In instances of at least a partial-hardware implementation the interconnection 128, the hardware may exist separately from any hardware (e.g., processors, memory, physical wires, etc.) included in the processing nodes 106 or may use hardware common to the processing nodes 106. In instances of at least a partial-software implementation of the interconnection 128, the software may be stored and executed on one or more of the memories 107 and processors 105 of the processor nodes 106 or may be stored and executed on separate memories and processors that are in communication with the processor nodes 106. In one example, interconnection 128 may include multi-channel media such that if one channel ceases to properly function, another channel may be used. Additionally or alternatively, more than one channel may also allow distributed communication to reduce the possibility of an undesired level of communication congestion among processing nodes 106.

Figure 2:
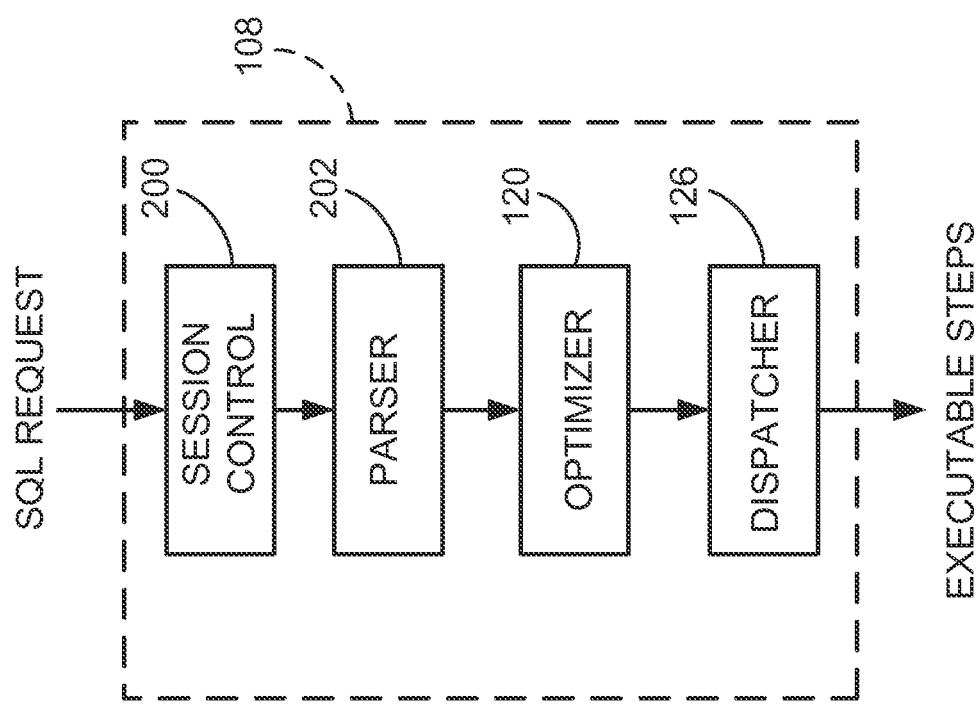
FIG. 2 is a block diagram of a portion of the example database system of FIG. 1.

In one example system, each parsing engine module 108 includes three primary components: a session control module 200, a parser module 202, and a dispatcher module 126 as shown in FIG. 2. The session control module 200 provides the logon and logoff functions. It accepts a request for authorization to access the database, verifies it, and then either allows or disallows the access. Once the session control module 200 allows a session to begin, an SQL request may be received such as through submission by a user and the SQL request is routed to the parser module 202.

Figure 3:
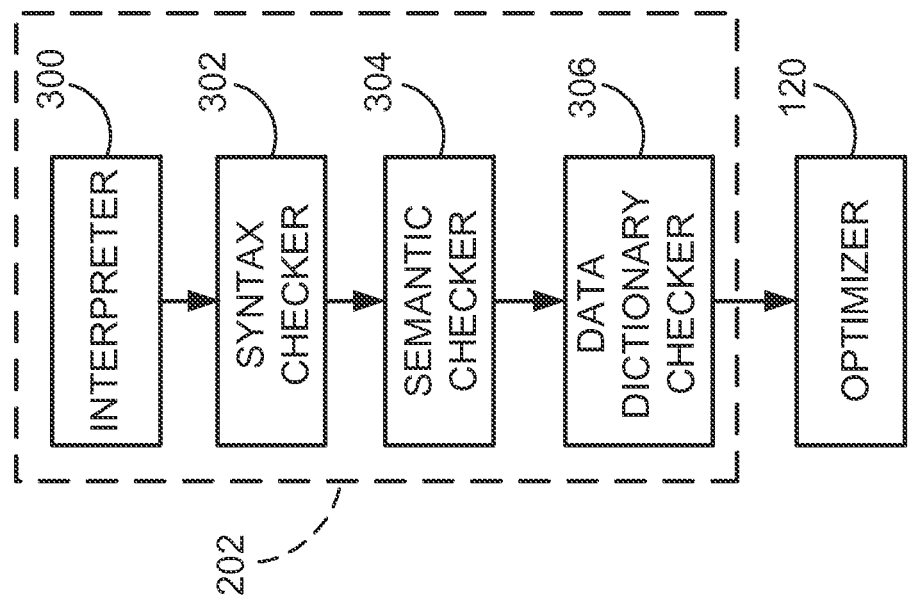
FIG. 3 is a block diagram of another portion of the example database system of FIG. 1.

As illustrated in FIG. 3, the parser module 202 may include an interpreter module 300 that interprets the SQL request. The parser module 202 may also include a syntax checker module 302 that checks the request for correct SQL syntax, as well as a semantic checker module 304 that evaluates the request semantically. The parser module 202 may additionally include a data dictionary checker 306 to ensure that all of the objects specified in the SQL request exist and that the user has the authority to perform the request. The parsing engine module 108 implements the optimizer module 120 to select the least expensive plan to perform the request, and the dispatcher 126 coordinates the runtime execution of executable steps of the query execution plan of the optimizer module 120 with the access modules 110.

In one example, to facilitate implementations of automated adaptive query execution strategies, such as the examples described herein, the WM 124 is configured to monitor runtime exception criteria. The WM 124 monitoring takes place by communicating with the dispatcher module 126 as it checks the query execution step responses from the access modules 110. The step responses include the actual cost information, which the dispatcher module 126 may then communicate to the WM 124 which, in turn, compares the actual cost information with the estimated costs of the optimizer module 120.

During operation, histograms may be used by the optimizer 120 when selecting a query plan. Some histograms may indicate selectivity values, which indicate the number of rows associated with various values in columns of data in a particular table of interest. Each histogram may provide selectivity data on one or more columns of a table. In one example, a histogram may include a plurality of intervals. Each interval may represent the total number of one or more particular values in a column of a database table. In one example, histograms may be generated on multi-dimensional data, which are represented in database tables as multiple columns of interrelated data, such as global coordinate data, which may be represented in two columns storing latitude and longitude values, for example.

FIG. 4 is an operational flow diagram of the RDBMS 102. The RDBMS 102 may generate statistics on one or more tables at a predetermined time (400), which may be regularly scheduled or triggered by some event. The statistics may include histograms. The generated statistics may be stored in the RDBMS 102 (402). The RDBMS 102 may receive a query, such as the query 130, involving one or more of the database tables on which the histograms are generated (404). Upon receipt of the query, the RDBMS 102 may retrieve the statistics associated with the database tables of the query (406). The RDBMS 102 may determine query response costs based on the retrieved statistics (408). A query response plan may be selected by the optimizer module 120 based on the query response costs (410) and executed (412) by the RDBMS 102. The results may be transmitted to a user interface (414), such as that included in the client system 114.

Figure 5B:
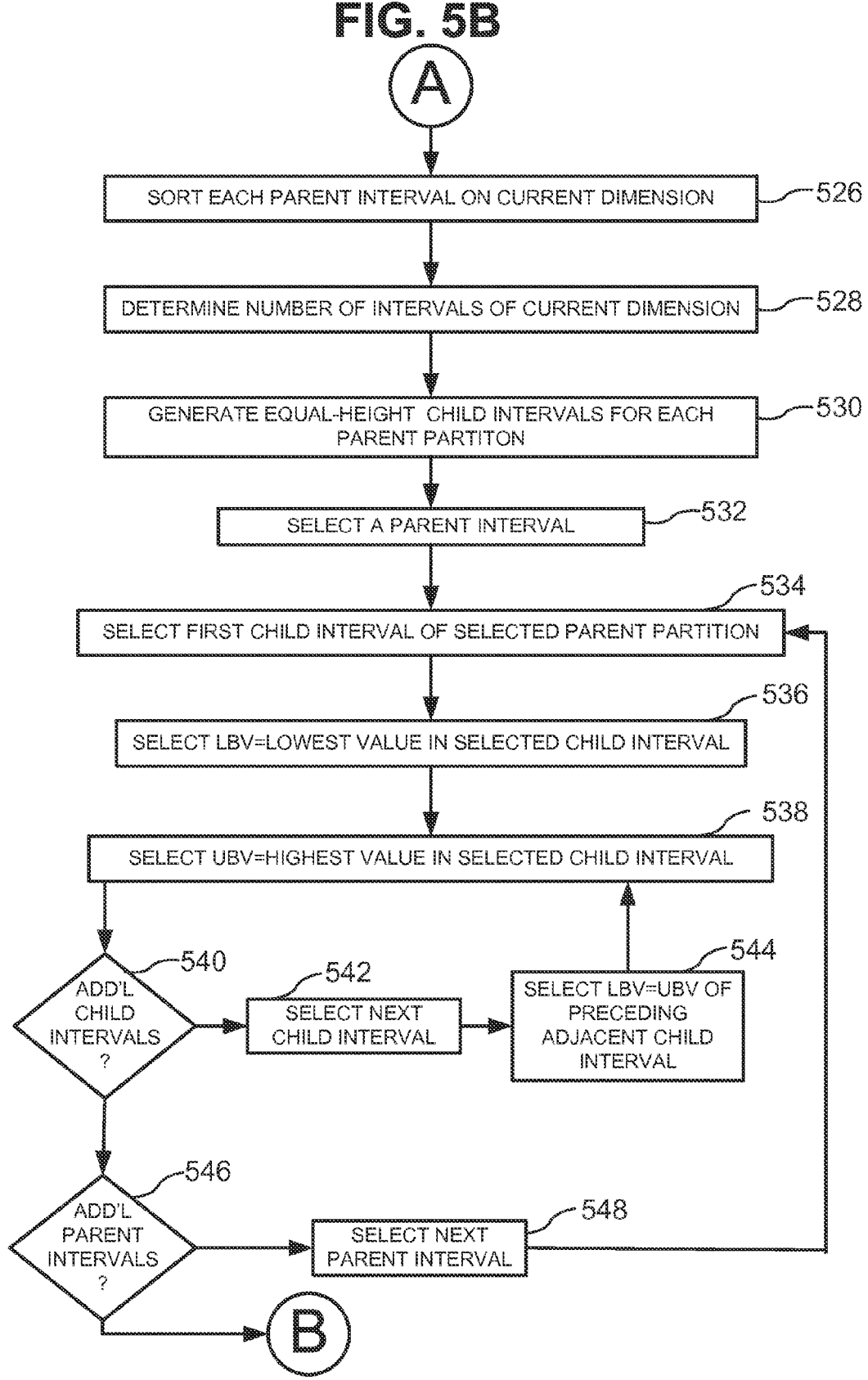

In one example, in operation (400) the RDBMS 102 may generate a histogram based on multi-dimensional data with each dimension represented by columns of a common table, which may be subsequently used by the optimizer 120 to generate a query response. FIGS. 5A and 5B are an operational flow diagram of the RDBMS 102 during histogram generation on a multi-dimensional dataset, which may be performed as part or entirely of operation (400). In one example, the RDBMS 102 may identify a multi-dimensional dataset (500), which may be represented by multiple columns in a data table. The identification may occur based on predetermined relationships amongst the dimensions, such as geospatial data, or based on query patterns that query the dimensions together. The RDBMS 102 may identify the number of dimensions of the multi-dimensional dataset (502). In one example, the number of columns of the identified dataset may represent the number of dimensions. The RDBMS 102 may select the first dimension (504). Selection of each dimension may be based on the order in which columns appear in a table or based on user-received dimension ordering. Upon selection of the first dimension, the dataset may be sorted on the values of the first dimension (506), such that each row of the dataset is sorted with the corresponding value of the first dimension. Sorting may be performed in ascending value order. The RDBMS 102 may determine the number of intervals for the first dimension (508), which may be a user-based preselected value, based on system parameters, or any other manner that is within system size constraints, for example. Once the number of intervals is determined, the RDBMS 102 may generate the number of intervals to be equal-height intervals (510). For purposes of this disclosure "equal-height" may refer to the number of values (rows) contained by each interval to be equal or within one value of another such that the sum of the total rows over all intervals is equal to the total number of rows in the table. Once intervals are established, the number of rows per interval or "row count" is known by the RDBMS 102. For the first interval associated with the first dimension, i.e., the interval containing the lowest values after sorting, the RDBMS 102 may select a lower boundary value (LBV) for the first interval to be the lowest value in the first interval (512). The RDBMS 102 may select an upper boundary value (UBV) to be the highest value in the interval (514).

The RDBMS 102 may determine if additional intervals exist (516). If so, the RDBMS 102 may select the next interval (518) and select the lower boundary value of the selected interval to be the upper boundary value of the preceding adjacent interval (520). Thus each "lower" adjacent interval has an upper boundary value equal to the lower boundary value of the next interval. The RDBMS 102 may select the upper boundary value of the selected interval to be highest value of the first dimension in the selected interval (514), which is the last value due to the performed sort. The RDBMS 102 may continue to determine if additional intervals for the first dimension exist (516), and if so, may continue to select the intervals (518) and, for each selected interval, select the lower boundary value to be the upper boundary value of the preceding adjacent interval (520) and the upper boundary value to be the highest value in the selected interval (514).

Once the RDBMS 102 determines all intervals for the first dimension have been analyzed (516), the RDBMS 102 may determine if additional dimensions exist (522). For a multi-dimensional dataset, there will be at least two dimensions. If additional dimensions exist, the RDBMS 102 may select the next dimension to be the "current dimension" for purposes of analysis (524). Once the current dimension is selected, the RDBMS 102 may sort each parent interval on the current dimension (526). "Parent interval" may refer to each interval generated based on the previous dimension. For example, in analyzing the second dimension of a dataset, the intervals created on the first dimension are the parent intervals with respect to the second dimension.

Once each parent interval is sorted, the RDBMS 102 may determine the number of intervals for the current dimension (528). The number represents how many "child" intervals are to be generated for each parent interval. A child interval may refer to an interval created on a parent interval. For example, if three parent intervals exist and the number of intervals for the current dimension is two, then the values in each of the three parent intervals may be partitioned into two child intervals resulting in six total new intervals. The RDBMS 102 may generate equal-height child intervals (530), which provide the RDBMS 102 with the row count of each child interval, and once generated, a parent interval may be select (532). Upon selection of a parent interval, the first child interval of the parent interval may be selected (534). The first child interval for a parent interval may be the child interval containing the lowest values of the current dimension after sorting with respect to "sibling" intervals, e.g., child intervals of the same parent interval.

The RDBMS 102 may select the lower boundary value for the first child interval (536), which may be the lowest value (and first value after sorting) of the current dimension in the child interval. The RDBMS 102 may also select the upper boundary value for first child interval (538), which is the highest value (and last value after sorting) in the first child interval. The RDBMS 102 may determine if additional child intervals for the selected parent interval exist (540). If so, the RDBMS 102 may select the next child interval (542) to determine the lower boundary value (544), which is selected to be the upper boundary value of the preceding adjacent child interval. The RDBMS 102 may select the upper boundary value of the selected child interval to be the highest value in the selected child interval (538). The RDBMS 102 may then determine if additional child intervals exist for the selected parent interval (540). For each child interval that exists, the RDBMS 102 may select the lower and upper boundary values, with the lower boundary values of each child interval being the upper boundary value of the preceding adjacent child interval (544) and the upper boundary value being the highest value of the current dimension in the selected child interval (538).

Once the RDBMS 102 determines that no additional child intervals exist (540), the RDBMS 102 may determine if any additional parent intervals exist (546). If so, the next parent interval may be selected (548) and the first child interval may be selected for the selected parent interval (534). As previously described, the lower boundary value for the first child interval of the selected parent interval may be selected (536) and the upper boundary may be selected (538). For any additional child intervals for the selected parent interval, the RDBMS 102 may select the lower boundary values to be the value of the upper boundary value of the preceding adjacent interval (544) and the upper boundary value (538). For each additional parent interval, the RDBMS 102 may continue to establish boundary values for child intervals accordingly.

Once the RDBMS 102 determines no additional parent intervals for the current dimension exist (546), the RDBMS 102 may determine if additional dimensions exist (522). If so, the RDBMS may select the next dimension to be the current dimension for analysis (524). As previously discussed, the last-created child intervals become the parent intervals to child intervals created on the current dimension. Accordingly, the RDBMS 102 may sort the parent intervals on the current dimension (526) and determine the number of child intervals to be created for each parent interval (528). For each selected parent interval, the RDBMS 102 may traverse each child interval to determine boundary values of each first child interval (536) and (538) and the lower and upper boundary values of other child nodes of the selected parent interval may be selected in operations (544) and (538), respectively.

The values of each existing dimension of the dataset may be partitioned in a similar manner as that described allowing boundary values of the first child interval of each selected parent interval to be determined. Once the RDBMS 102 determines all dimensions have been analyzed, the RDBMS 102 may store the multi-dimensional histogram for subsequent use (402).

Figure 6:
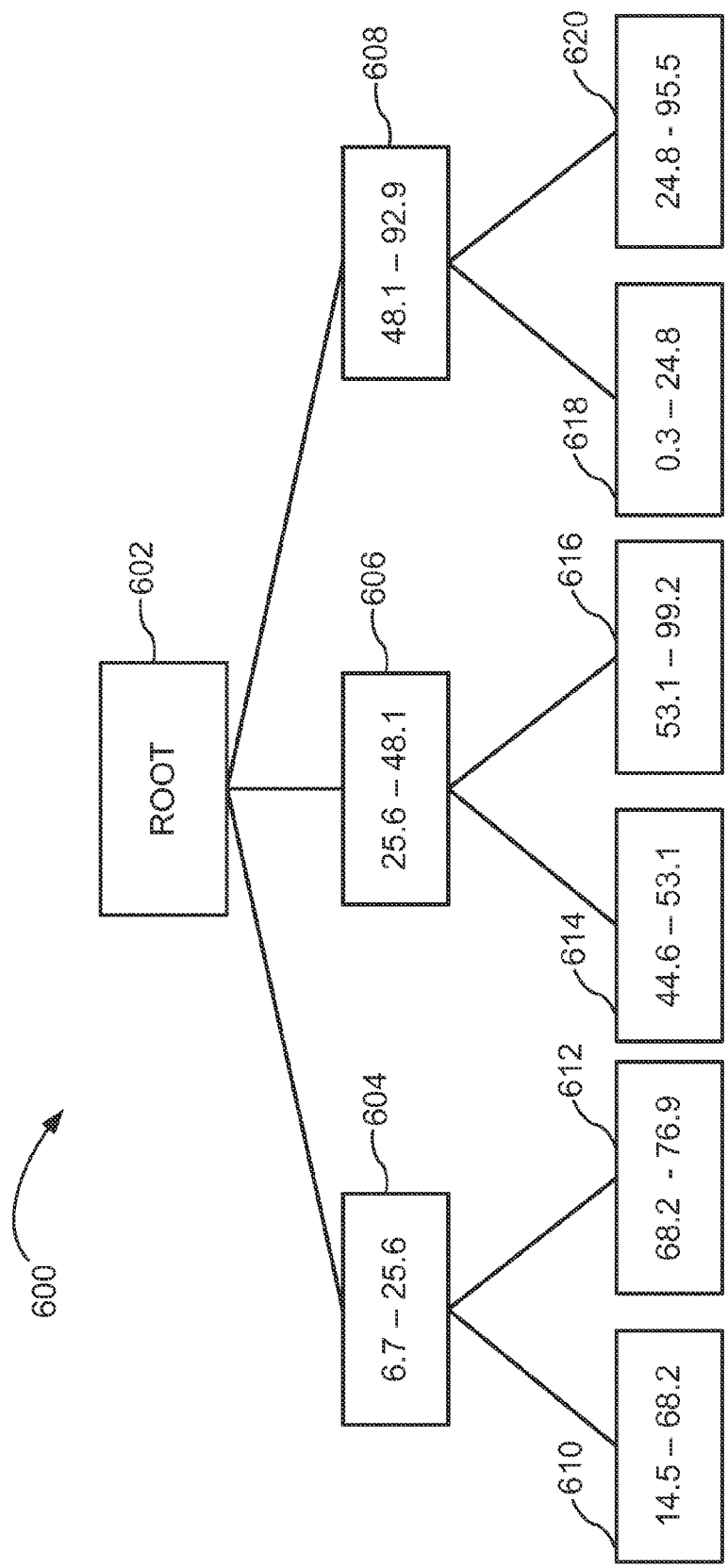
FIG. 6 is an example of an interval tree.

The result of the performance of the operational flow diagram in FIGS. 5A and 5B is histogram represented by an interval tree as illustrated in FIG. 6. FIG. 6 is an interval tree 600 for a two-dimensional data set as shown in Table 1.

TABLE 1

| x | y |
|---|---|
| 16.5 | 69.5 |
| 39.5 | 91.8 |
| 48.1 | 53.1 |
| 8.1 | 37.6 |
| 42.9 | 47.2 |
| 77.9 | 94.1 |
| 67.4 | 0.3 |
| 26.2 | 44.6 |
| 11.7 | 76.8 |
| 34.6 | 51.3 |
| 25.6 | 68.2 |
| 59.3 | 24.8 |
| 12.3 | 14.5 |
| 92.9 | 3.8 |
| 26.7 | 99.2 |
| 75.8 | 78.1 |
| 63.6 | 95.5 |
| 22.9 | 39.4 |
| 80.5 | 10.9 |
| 22.8 | 69.5 |
| 33.1 | 68.4 |
| 6.7 | 72.3 |

TABLE 1-continued

| x | y |
|---|---|
| 52.2 | 54.3 |
| 32.6 | 60.0 |

The "ROOT" 602 represents the entire multi-dimension dataset. Following the operational flow diagram of FIGS. 5A and 5B, one of the dimensions, the "x"-dimension in FIG. 6 is selected. The dataset may be sorted on the x-dimension, such that the corresponding values of the "y"-dimension of a common row are sorted on the x-dimension as well. Once sorted, the number of intervals for the x-dimension may be determined, which in this example is three. The RDBMS 102 may generate three equal-height intervals. The three intervals 604 through 608 of the x-dimension are generated and the boundary values of each interval are determined. In accordance with the operational flow diagram of FIGS. 5A and 5B, the intervals of the x-dimension may be traversed beginning with the interval having the lowest values with respect to the other intervals, which is interval 604. As each interval is traversed, the lower and upper boundary values may be selected. For example, interval 604 containing the x-dimension values from 6.7 to 25.6 has a lower boundary value of 6.7 and upper boundary of 25.6. The next interval analyzed is interval 606, which has a lower boundary value selected to be that of the upper boundary of the preceding adjacent interval, interval 604, which has an upper boundary value of 25.6. The upper boundary value of the interval 606 is 48.1.

Once the x-dimension is partitioned and boundary values are determined, each interval 604 through 608 may be sorted based on the y-dimension into a predetermined number of intervals. In the example of FIG. 6, the number associated with the y-dimension is two, which indicates the number of equal-height intervals to be created for each interval of the prior dimension, which in this example, results in six total intervals on the y-dimension. Thus, each interval on the x-dimension is a parent node to two child intervals on the y-dimension. Once the intervals 610-620 are generated, the intervals 610-620 may be traversed to determine the boundary values with respect to each parent node. For example, the child intervals 610 and 612 of the parent interval 604 may be traversed in the order of the child interval having the lowest sorted values of the y-dimension. The lower boundary value of the child interval 610 is the lowest value in the interval, which is 14.5, and an upper boundary value that is the highest value in the interval 610, 68.2. The lower boundary value of the interval 612 is the upper boundary value of the adjacent preceding interval 610, 68.2. Boundary values are only shared by child intervals of a common parent. Thus, the lower boundary value of the child interval 614 is the lowest y-dimension value in the interval 614, 44.6, and the upper boundary value is the highest value, 53.1. The other child interval 616 of the parent interval 606 has a lower boundary value equal to the upper boundary value of the preceding adjacent interval 612, 53.1. Boundary values of the intervals 618, 620 may be determined in a similar manner.

As shown in FIG. 6, the result of the operational flow diagram of FIG. 5 provides a tree structure allowing row counts for ranges of the multi-dimension data to be determined for query planning. For example, provided a range of values in a query, the RDBMS 102 may traverse the interval tree 600 to identify row counts associated with the query ranges. If a query included an x-range of 17 to 28, and a y-range of 16 to 52, the RDBMS 102 may use the histogram represented by the interval tree 600. The RDBMS 102 may find each x-range interval that matches the x-range of the query. In this example, both intervals 604 and 606 would be selected. Traversing through those intervals, the y-range may be analyzed. In this case, matching up the y-range of the query to the y-range of histogram would identify the intervals 610 and 614, since both contain y-values in the query range. Thus, the row counts associated with the intervals 610 and 614 would provide an estimate as to how many rows may be returned in a query response.

Figure 7:
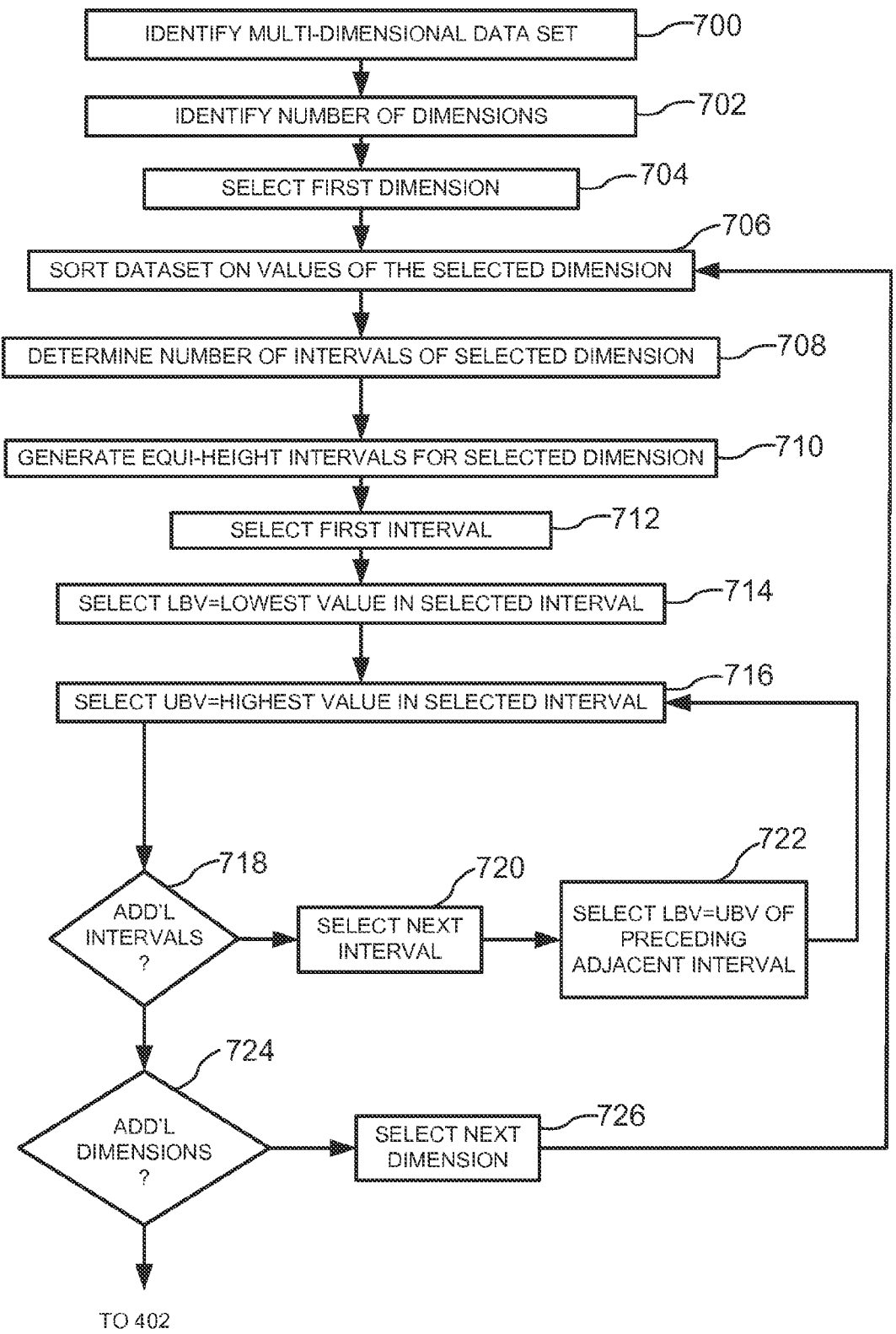
FIG. 7 is an operational flow diagram of example histogram generation of a multi-dimensional dataset.

FIG. 7 is another operational flow diagram to generate a histogram on a multi-dimensional dataset. The RDBMS 102 may identify a multi-dimensional dataset (700). The RDBMS 102 may determine the number of dimensions in the dataset (702), which may be represented by the number of columns. The RBDSM 102 may select the first dimension (704) and sort the dataset on values of the dimension in ascending value order (706). The RDBMS 102 may determine the number of intervals associated with the selected dimension (708), which may be predetermined or user-selected. The RDBMS 102 may generate equal-height intervals based on the number of intervals for the selected dimension (710). The RDBMS 102 may select the first interval of the selected dimension, which includes the lowest relative values of all intervals (712). The RDBMS 102 may select the lower boundary value of the first interval (714), which is lowest value in the interval and the upper boundary value, which is the highest value in the interval (716). The RDBMS 102 may determine if additional intervals exist (718). If so, the RDBMS 102 may select the next interval (720). The RDBMS 102 may select the lower boundary value of the selected interval to be the upper boundary value of the preceding adjacent interval (722) and select the upper boundary value of the selected interval (716). If no additional intervals exist (718), the RDBMS 102 may determine if additional dimensions exist (724). If so, the RDBMS 102 may select the current dimension to be the next existing dimension (726). The RDBMS 102 may then sort the dataset on the values (rows) of the selected dimension (706) and determine the number of intervals associated with the selected dimension (708). The dataset may be partitioned into the number of intervals accordingly (710). Similar to that previously described regarding the first dimension, the RDBMS 102 may identify the first interval for the current dimension to set the lower boundary value (714) and the upper boundary value (716). For each other intervals of the current dimension, if any exist, the RDBMS 102 may select the lower boundary value (722) and the upper boundary value (716). Once the RDBMS 102 determines that no additional dimensions exist (726), the boundary values and row counts may be stored as the histogram (402). The histogram generated by the operational flow diagram of FIG. 7 provides a plurality of vectors on each dimension. A query response plan cost analysis implementing the histogram would search for the intersecting values across the intervals on each dimension based on a received query.

The examples herein have been provided with the context of a relational database system. However, all examples are applicable to various types of data stores, such as file systems or other data stores suitable for organization and processing of data. Moreover, additional or fewer operations of the operational flow diagrams may be implemented in some examples and the orders may be changed in some examples. While various embodiments of the invention have been described, it will be apparent to those of ordinary skill in the art that many more examples and implementations are possible within the scope of the invention. Accordingly, the invention is not to be restricted except in light of the attached claims and their equivalents.

We claim:

1. A data store system comprising:
an array of persistent storage devices configured to store a plurality of data tables;
a processor in communication with the persistent storage devices, the processor configured to:
receive a request to generate a multi-dimensional histogram on at least one of the plurality of data tables;
identify a multi-dimensional dataset stored in the at least one of the plurality of data tables;
identify each dimension of the multi-dimensional dataset;
for each respective identified dimension:
sort the identified multi-dimensional dataset on values of the respective identified dimension;
for each respective identified dimension:
partition the sorted dataset into a predetermined number of intervals associated with the respective identified dimension;
determine a number of rows for each interval; and
select a lower boundary value and an upper boundary value for each interval, wherein the upper boundary value is the highest value in each interval, wherein the lower boundary value for an interval having lowest sorted values is the lowest value in the interval, and the lower boundary value for each other interval is the upper boundary value of an interval having immediately preceding partitioned values;
store the lower boundary values, upper boundary values, and number of rows for each interval of each identified dimension as the histogram;
receive a query on the at least one of the plurality of data tables; and
generate a query response based on the histogram.

2. The data store system of claim 1, wherein the processor is further configured to partition the sorted dataset into a predetermined number of intervals associated with the respective identified dimension, wherein the dataset is partitioned into equal-height intervals.

3. The database system of claim 1, wherein the processor is further configured to:
for each respective other identified dimension after a first identified dimension;
determine a predetermined number of intervals associated with the respective other identified dimension:
sort each interval generated on a dimension immediately prior to the respective other identified dimension based on values of the respective other dimension;
for each interval of the dimension immediately prior, generate an interval group, wherein each interval group comprises a number of intervals, wherein the number is the predetermined number of intervals associated with the respective other dimension;
for each interval group, determine a number of rows in each interval and select a lower boundary value and an upper boundary value for each interval of the respective interval group, wherein the upper boundary value is the highest value in each interval of the respective interval group, wherein the lower boundary value for an interval having lowest sorted values is the lowest value in the interval of the respective interval group, and the lower boundary value for each other interval of the respective interval group is the upper boundary value of an interval of the respective interval group having immediately preceding partitioned values; and store the lower boundary value, the upper boundary value, and the number of rows for each interval as the histogram.

4. The data store system of claim 1, wherein the processor is further executable to, for each dimension, select each interval in an order of values in each interval.

5. The data store system of claim 1, wherein the at least one of the plurality of data tables is a single data table.

6. The data store system of claim 1, wherein each interval contains at least one row.

7. A computer-implemented method comprising:
receiving a request to generate a multi-dimensional histogram on at least one of a plurality of data tables stored in an array of persistent storage devices;
retrieving the at least one of the plurality of data tables;
identifying a multi-dimensional dataset stored in the at least one of the plurality of data tables;
identifying each dimension of the multi-dimensional dataset;
for each respective identified dimension:
sorting the identified multi-dimensional dataset on values of the respective identified dimension;
partitioning the sorted dataset into a predetermined number of intervals associated with the respective identified dimension;
determining a number of rows for each interval; and
selecting a lower boundary value and an upper boundary value for each interval, wherein the upper boundary value is the highest value in each interval, wherein the lower boundary value for an interval having lowest sorted values is the lowest value in the interval, and the lower boundary value for each other interval is the upper boundary value of an interval having immediately preceding partitioned values;
storing the lower boundary values, upper boundary values, and number of rows for each interval of each identified dimension as the histogram;
receiving a query on the at least one of the plurality of data tables; and
generating a query response based on the histogram.

8. The computer-implemented method of claim 7, wherein partitioning the sorted dataset into a predetermined number of intervals associated with the respective identified dimension comprises partitioning the sorted dataset into a predetermined number of intervals associated with the respective identified dimension, wherein the dataset is partitioned into equal-height intervals.

9. The computer-implemented method of claim 7, further comprising:
for each respective other identified dimension after a first identified dimension:
determining a predetermined number of intervals associated with the respective other identified dimension;
sorting each interval generated on a dimension immediately prior to the respective other identified dimension based on values of the respective other dimension;
for each interval of the dimension immediately prior, generating an interval group, wherein each interval group comprises a number of intervals, wherein the number is the predetermined number of intervals associated with the respective other dimension;
for each interval group, determining a number of rows in each interval and selecting a lower boundary value and an upper boundary value for each interval of the respective interval group, wherein the upper boundary value is the highest value in each interval of the respective interval group, wherein the lower boundary value for an interval having lowest sorted values is the lowest value in the interval of the respective interval group, and the lower boundary value for each other interval of the respective interval group is the upper boundary value of an interval of the respective interval group having immediately preceding partitioned values; and
storing the lower boundary value, the upper boundary value, and the number of rows for each interval as the histogram.

10. The computer-implemented method of claim 7, further comprising, for each dimension, selecting each interval in an order of values in each interval.

11. The computer-implemented method of claim 7, wherein the at least one of the plurality of data tables is a single data table.

12. The data store system of claim 1, wherein each interval contains at least one row.

13. A non-transitory computer-readable medium encoded with a plurality of instruction executable by a processor, the plurality of instructions comprising:
instructions to receive a request to generate a multi-dimensional histogram on at least one of a plurality of data tables stored in an array of persistent storage devices;
instructions to retrieve the at least of the plurality of data tables;
instructions to identify a multi-dimensional dataset stored in the at least one of the plurality of data tables;
instructions to identify each dimension of the multi-dimensional dataset;
for each respective identified dimension:
instructions to sort the identified multi-dimensional dataset on values of the respective identified dimension;
instructions to partition the sorted dataset into a predetermined number of intervals associated with the respective identified dimension;
instructions to determine a number of rows for each interval; and
instructions to select a lower boundary value and an upper boundary value for each interval, wherein the upper boundary value is the highest value in each interval, wherein the lower boundary value for an interval having lowest sorted values is the lowest value in the interval, and the lower boundary value for each other interval is the upper boundary value of an interval having immediately preceding partitioned values;
instructions to store the lower boundary values, upper boundary values, and number of rows for each interval of each identified dimension as the histogram;
instructions to receive a query on the at least one of the plurality of data tables; and
instructions to generate a query response based on the histogram.

14. The non-transitory computer-readable medium of claim 13, wherein the plurality of instructions further comprises instructions to partition the sorted dataset into a predetermined number of intervals associated with the respective identified dimension, wherein the dataset is partitioned into equal-height intervals.

15. The non-transitory computer-readable medium of claim 13, wherein the plurality of instructions further comprises:
for each respective other identified dimension after a first identified dimension:

instructions to determine a predetermined number of intervals associated with the respective other identified dimension;

instructions to sort each interval generated on a dimension immediately prior to the respective other identified dimension based on values of the respective other dimension;

for each interval of the dimension immediately prior, generating an interval group, wherein each interval group comprises a number of intervals, wherein the number is the predetermined number of intervals associated with the respective other dimension;

for each interval group, instructions to determine a number of rows in each interval and to select a lower boundary value and an upper boundary value for each interval of the respective interval group, wherein the upper boundary value is the highest value in each interval of the respective interval group, wherein the lower boundary value for an interval having lowest sorted values is the lowest value in the interval of the respective interval group, and the lower boundary value for each other interval of the respective interval group is the upper boundary value of an interval of the respective interval group having immediately preceding partitioned values; and instructions to store the lower boundary value, the upper boundary value, and the number of rows for each interval as the histogram.

16. The non-transitory computer-readable medium of claim 13, wherein the plurality of instructions further comprises for each dimension, instructions to select each interval in an order of values in each interval.

17. The non-transitory computer-readable medium of claim 13, wherein the at least one of the plurality of data tables is a single data table.

* * * * *